(12) United States Patent
Harbs et al.

(10) Patent No.: US 10,383,343 B2
(45) Date of Patent: Aug. 20, 2019

(54) INSTALLATION FOR PRODUCING AND/OR PROCESSING CONFECTIONERY MASSES AND METHOD FOR PRODUCING AND/OR PROCESSING CONFECTIONERY MASSES

(71) Applicant: NETZSCH-Feinmahltechnik GmbH, Selb (DE)

(72) Inventors: Theron Harbs, Selb (DE); Holger Moeschl, Selb (DE); Lars-Peter Weiland, Schönwald (DE); Sergio Devegili, Pomerode (BR)

(73) Assignee: NETZSCH-Feinmahltechnik GmbH, Selb (DE)

( * ) Notice: Subject to any disclaimer, the term of this patent is extended or adjusted under 35 U.S.C. 154(b) by 170 days.

(21) Appl. No.: 15/240,814

(22) Filed: Aug. 18, 2016

(65) Prior Publication Data

US 2016/0353762 A1 Dec. 8, 2016

Related U.S. Application Data

(63) Continuation of application No. PCT/DE2015/000089, filed on Feb. 26, 2015.

(30) Foreign Application Priority Data

Feb. 26, 2014 (DE) .................. 10 2014 102 526

(51) Int. Cl.
*A23G 1/10* (2006.01)
*A23G 3/02* (2006.01)
(Continued)

(52) U.S. Cl.
CPC ............. *A23G 1/10* (2013.01); *A23G 3/0215* (2013.01); *B01F 3/12* (2013.01); *B01F 3/1214* (2013.01);
(Continued)

(58) Field of Classification Search
CPC ...... A23G 1/10; A23G 3/0215; A23G 3/0002; A23G 3/0006; A23G 3/0003; A23G 1/0003; B01F 3/12; B01F 7/022
(Continued)

(56) References Cited

U.S. PATENT DOCUMENTS 2,915,023 A 12/1959 Rapaport
5,865,536 A * 2/1999 Mechias ................... A23G 1/10
134/22.14

FOREIGN PATENT DOCUMENTS

CH 291175 A 6/1953
DE 2313626 A1 9/1973
(Continued)

OTHER PUBLICATIONS

International Search Report Application No. PCT/DE2015/000089 Completed: Jul. 3, 2015; dated Jul. 15, 2015 3 pages.
(Continued)

*Primary Examiner* — Jyoti Chawla
(74) *Attorney, Agent, or Firm* — Whitmyer IP Group LLC

(57) ABSTRACT

An installation and method for producing and/or processing confectionery masses which are made from at least one liquid raw material and granular and/or powdery raw materials. The installation includes at least a first mixing container and at least one further product-processing device. The first mixing container has at least one raw-material inlet and a product outlet and a mixing device for mixing the raw materials at least largely homogeneously. At least the mixing container includes at least one spraying device in an upper container region, which at least one spraying device serves to feed the at least one liquid raw material, wherein at least one outlet cone of the spraying device is directed, at least in some regions, toward an inner wall surface of the first mixing container.

19 Claims, 9 Drawing Sheets

(51) Int. Cl.
    *B01F 15/02*  (2006.01)
    *B01F 7/02*   (2006.01)
    *B01F 7/26*   (2006.01)
    *B01F 3/12*   (2006.01)
    *B01F 5/20*   (2006.01)
    *B01F 15/00*  (2006.01)
    *B01F 15/06*  (2006.01)

(52) U.S. Cl.
    CPC .............. *B01F 3/1221* (2013.01); *B01F 5/20* (2013.01); *B01F 7/022* (2013.01); *B01F 7/26* (2013.01); *B01F 15/00038* (2013.01); *B01F 15/0235* (2013.01); *B01F 15/0254* (2013.01); *B01F 15/06* (2013.01); *B01F 2003/1257* (2013.01); *B01F 2015/062* (2013.01); *B01F 2215/0014* (2013.01)

(58) Field of Classification Search
    USPC ........................................................ 426/660
    See application file for complete search history.

(56) References Cited

FOREIGN PATENT DOCUMENTS

| DE | 69002057 T2  |   | 1/1994  |              |
|----|--------------|---|---------|--------------|
| DE | 19638710 A1  |   | 6/1997  |              |
| DE | 19637098 A1  |   | 3/1998  |              |
| DE | 69835115 T2  |   | 2/2007  |              |
| EP | 1854532 A1   | * | 11/2007 | .......... B01F 7/00208 |
| JP | 2010075891 A |   | 4/2010  |              |

OTHER PUBLICATIONS

Written Opinion of the International Searching Authority Application No. PCT/DE2015/000089 5 pages.

\* cited by examiner

INSTALLATION FOR PRODUCING AND/OR PROCESSING CONFECTIONERY MASSES AND METHOD FOR PRODUCING AND/OR PROCESSING CONFECTIONERY MASSES

TECHNICAL FIELD

The present invention relates to an installation and to a method for producing and/or processing confectionery masses which are made from at least one liquid raw material and granular and/or powdery raw materials.

BACKGROUND

The invention relates to an installation and to a method for producing and/or processing confectionery masses. Confectionery masses are in particular understood as the basic ingredients of many sweets, for example chocolate, pralines, tenderly melting coatings, tasty spreads, fillings and so on.

To date, the focus in the production planning was mainly on a high product throughput. Due to the fact that the installation must in each case be cleaned completely in response to a product change so as to rule out product residues in the system or effects caused by cross-contaminations, in particular a smaller variety of products was accepted. This does not only reduce the flexibility in response to the conversion of product lines, but also the utilization of the installations and thus the cost effectiveness.

Compared to the milk-processing industry, to the beverage industry or even to the pharmaceutical industry, the confectionery manufacturers have been enjoying a clear advantage so far in terms of demonstrably germ-free production: cacao acts like an antioxidant, sugar acts like a natural preservative and the water content of most of the confectionery masses is very low. The possible risk of microbial contamination of the products is thus extremely small. The reason for this is, inter alia, that the confectionery industry operates with high temperatures and in dry environment as compared to many other industrial production processes. On principle, the dominating raw materials, such as sugar, cacao and most of the fats are microbiologically uncritical.

The modern consumer nonetheless attaches increased value to quality assurance even in the case of the confectionery products, which have an emotional character, both in the case of the raw materials and all the with regard to the processing. For the manufacturers, this means in detail that the demand for high-quality, hygienically processed products will increase. The demands for transparent and complete information relating to the products and their production processes also increase. Official inspection agencies will also assess the hygiene and quality in the production of confectionery masses more strictly in the future. As a whole, it can be assumed that the demands for the production installations will be higher than before in the future.

The product programs of the manufacturers also diversify increasingly, whereby the respective quantities decrease. Accordingly, cost effectiveness and efficiency of cleaning procedures and cleaning devices become more and more important. Commonly, all of the components of an installation must be taken apart, cleaned, dried and must subsequently be assembled again in response to a product change. This is very time and cost-intensive. It must be ensured in particular that no moisture reaches into the installation, because this involves the risk of the formation of germs.

DE 19637098 A1 describes a device for mixing and/or refining chocolate masses. A channel, which extends along its longitudinal axis and which is substantially subjected to the air, can be connected to the conching vessel hereby. A cleaning tool can be inserted into the channel in extension of this longitudinal axis.

DE 69002057 T2 describes a reactor for processing liquid cacao and the derivatives thereof. In the case of the reactor, the pump of the circulating devices is attached outside of the container and is driven by devices, which are separated from the drive devices for the rotating shaft. The circulating devices furthermore have a suction line, which connects said outlet on the container to the pump, and a conveying line from the pump into the interior of the container, and devices for introducing fluids into the liquid cacao are connected to said suction line. Said devices for the introduction of fluids can in particular have devices for introducing water or aqueous solutions and/or devices for introducing air. To be able to empty the reactor easily, a special type of the embodiment provides for the pump to be reversible, for the first three-way valve to be arranged in said suction line, and for said conveying line to pass through a bottom of the container in the vicinity of a lowest point of said bottom and to have openings, which are connected to the interior of the container, and which provide for the emptying of the substances, which have settled on said lowest point, by means of suction.

It is the object of the invention to provide for an installation and a method for producing and/or processing confectionery masses, which allows for a cost-efficient and hygienic production of even small amounts of confectionery masses.

The above object is solved by means of an installation and a method for producing and/or processing confectionery masses, which comprise the features described in the present invention.

SUMMARY

The invention relates to an installation for producing and/or processing confectionery masses made from at least one liquid raw material and granular and/or powdery raw materials. On principle, the liquid raw material is a fat and/or oil. In many cases, fats are used, which are present in a solid state at normal room temperature. Prior to being added to the granular and/or powdery raw materials, they must be melted. The granular and/or powdery raw materials are refined sugar and/or powdered sugar, cacao or the like, for example. Provision can furthermore be made for the addition of lecithin or other suitable emulsifiers, which facilitate a mixing of the liquid raw materials with the granular and/or powdery raw materials. Lecithin furthermore serves to increase the quality in the chocolate and confectionary production. The use of lecithin, for example, decreases the viscosity of a chocolate or confectionery composition, whereby the processing time can be shortened and cacao butter can be saved. The product characteristics are furthermore also influenced advantageously. The chocolate becomes more resistant to increased temperatures, the shelf life is lengthened, the shine of the surface is increased, and a premature graying is reduced.

The installation comprises at least a first mixing container comprising a mixing device for mixing the raw materials at least almost completely homogenously. To fill the raw materials into the first mixing container, the latter has at least one raw material inlet and a product outlet. The installation can comprise further product-processing devices, in particular at least one grinding device for grinding the granular and/or powdery components of the raw material mixture.

Provision can be made for example for a pre-comminuting grinding device, by means of which granular raw materials are pre-ground prior to being filled into the mixing container. Provision can furthermore be made for a grinding device, which is arranged downstream, for finely grinding the granular and/or powdery raw materials, which are mixed with the fat and/or oil in the mixing container. The grinding device, which is arranged downstream, can be a ball mill, an agitator bead mill or also roll mills, for example, in particular three-roll mills or five-roll mills. These roll mills are also identified as three-roll mills or five-roll mills.

According to the invention, the first mixing container has at least one spraying device in an upper container area for supplying the at least one liquid raw material into the mixing container. The spraying device can in particular be assigned to the cover of the mixing container, the spraying device can be arranged so as to hang on the cover of the mixing container, for example. The outlet cone, by means of which the liquid raw material is sprayed into the mixing container from the spraying head, is thereby directed in the direction of an inner wall surface of the first mixing container, at least area by area, and covers the entire inner wall surface and/or ceiling surface in the upper container area of the first mixing container at least almost completely. At least two or more spraying heads, the outlet cones of which overlap in their adjoining edge areas, are preferably arranged in the upper area of the first mixing container, so that the liquid raw material wets the inner wall surfaces almost completely in the upper container area of the first mixing container. The liquid raw material is preferably sprayed onto the inner wall surfaces of the mixing container, preferably under pressure, via the spraying device.

The granular and/or powdery raw materials tend to form dust when being filled into the mixing container, and then settle in particular on the upper inner wall surfaces of the first mixing container, which are not in contact with the raw material mixture in the filled state of the first of the mixing containers. The first mixing container is in particular not filled completely, but only up to maximally 80% of its inner container volume, because a mixing of the raw materials by the mixing device would only be possible with difficulty in response to a filling of the inner container volume at more than 80%. By spraying the liquid raw material into an upper area of the first mixing container, it is avoided that granular and/or powdery raw materials, which are still mixed with liquid raw material or bound by the liquid raw material, respectively, settle on the inner wall surfaces in the upper container area of the first mixing container. The interior of the first mixing container can furthermore be embodied in such a way that it preferably does not have any corners and/or edges, but preferably only curvatures, in which the raw material mixture or individual raw materials, respectively, can settle only with difficulty. The inner wall surfaces can furthermore have non-adhesive characteristics, the inner wall surfaces, for example, are electropolished and/or are provided with a non-adhesive coating.

According to a preferred embodiment of the invention, the at least one spraying device, but preferably the at least two or three spraying devices, are pivotably movable and/or rotationally movable. The area of the inner wall surfaces, which are sprayed with the liquid raw material and which are wetted, can be increased further through this and a complete coverage can be achieved.

According to a further embodiment of the invention, provision can be made for the raw material inlet for the granular and/or powdery raw materials to be arranged in an upper container area of the first mixing container, in particular in an area above the maximum fill level of the first mixing container, but below the at least one spraying device. It can be avoided through this that liquid raw material and/or raw material mixture reaches into the raw material inlet for the granular and/or powdery raw materials. According to an alternative embodiment of the invention, the raw material inlet for the granular and/or powdery raw materials is located approximately at the same height or above the at least on spraying device.

In the case of the installation, provision is furthermore made for two product-processing devices, which are procedurally coupled to one another, to be coupled to one another in each case via a connecting line, in particular in each case via a ring line, which connects the two product-processing devices. The raw material mixture or product mixture is guided from the one product-processing device into the second procedurally coupled product-processing device via the connecting line, for example pumped. According to an embodiment of the invention, the raw material mixture is pumped from the first mixing container into a downstream product-processing device via a connecting line. A cleaning element, to which a so-called stand-by position is also assigned and which is movable within the connecting line, can be arranged in the connecting line. The cleaning element is used to free the connecting line from the residues of the granular and/or powdery raw materials of the raw material mixture, which might adhere to the inner wall surfaces of the connecting line. The dimensions of the cleaning element are adapted to the diameter of the connecting line, so that the cleaning element can release coating adhering to the inner wall of the connecting line. At least area by area, the cleaning element has a cross section, for example, which almost corresponds to a cross section of the connecting line. Provision is made in particular for no play or for only a small play to be embodied at least between a portion of the cleaning element and the inner wall of the connecting line. The cleaning element is driven by means of compressed air, for example, which is introduced into the connecting line. Other suitable fluids comprising a defined pressure can also be used. While the cleaning element passes through the connecting line or ring line, respectively, in the area between the mixing container and the downstream product-processing device, it pushes raw material mixture, which might be present in the connecting line, in front of it. This raw material mixture is then transferred into the product-processing device through openings in the connecting line in the area of the downstream product-processing device. The cleaning element is then conveyed further into its stand-by position.

According to a preferred embodiment of the installation, the installation comprises a mixing container, a finishing device, a process container and a grinding device. Provision is in each case made at least between the mixing container and the process container, the process container and the finishing device and/or between the process container and the grinding device for a connecting line, for example in the form of a ring line, comprising cleaning element. The connecting lines between the mixing container and the finishing device and/or between the mixing container and the process container and/or between the process container and the grinding device can in each case be kept clean from the raw material and/or product mixture.

According to a preferred embodiment of the invention, the installation is embodied as compact installation. The installation comprises a storage container for preheated, liquid fat, a first mixing container, a second process container, a finishing device and a grinding device. These product-processing devices of the installation are combined in a surrounding housing. The product-processing devices of the installation as well as the connecting lines between the product-processing devices are preferably heated, so as to provide for the tempering, which is required for this purpose, during the entire production process.

A side surface and the upper side of the housing of the installation are embodied as operator sides. On the upper side of the housing, the operator side is in particular embodied as work area for a human operator. In this work area, the housing comprises a first filling device for granular and/or powdery raw materials and a second filling device for a raw material fat. The first filling device is embodied, for example, as filling hopper for the granular and/or powdery raw materials. Said filling hopper is arranged above the first mixing container and forms a direct access to the first mixing container. Provision is preferably made in the access for a protection device, for example a lock cap or the like, which prevents a cloud of dust of granular and/or powdery raw materials from forming, which escapes from the first filling device and thus contaminates the work area or the environment of the installation, respectively. The second filling device is arranged above the storage container for the preheated, liquid fat and preferably forms a direct access to the storage container.

On principle, the fat, which is used as liquid raw material, is solid at room temperature and needs to be melted. For this purpose, the second filling device comprises a melting device for melting fats, which are provided in solid form, the fat is melted inside the second filling device on a heatable feeder grate, for example, and is transferred directly into the heated storage container by means of a collecting vessel. Due to the fact that the melting of the fat represents the most time-intensive step in the production, provision can be made for the capacity of the storage container to be sufficient for two raw material preparations or batches, respectively, in the mixing container. For example, only up to 120 kg of fat can be melted simultaneously, while 300 liters of melted fat are required for a total preparation of a confectionary or chocolate composition. The storage container for the melted fat holds a volume of approx. 500 liters, for example. While a raw material preparation or a batch, respectively, is thus processed in the mixing container and/or in other devices of the installation, the operator can already melt additional fat in the second filling device.

Provision can furthermore be made for the installation to comprise a lift means for providing raw materials. The raw materials for a preparation can thereby be assembled on a palette, for example, and can be supplied to the work area via the lift means. The lift makes it easier to provide the raw materials at the filling devices, which, according to the above description, are located on the upper side of the housing. The lift means can in particular be accessed from two sides, namely from a lateral operator side for loading the lift means with raw materials, and from the work area on the upper side of the housing for the operator to remove the raw materials. For example, the lift means is attached in such a way that a loaded euro-pallet can be introduced into the lift means, which can be closed by means of doors, on the lateral operator side with all of the raw materials required for a predetermined recipe.

The pallet, which is loaded with the raw materials, is set down in the lift means, for example by means of a forklift. Controlled by the operator, the lift means is then positioned in such a way that the operator can comfortably remove the raw materials in the work area. In particular, the vertical position of the lift means can be adjusted and the lift means can be positioned between the first and the second filling device in such a way that the operator does not need to lift the raw material packages or raw material sacks, but can simply push them onto an operating surface, which is assigned to the respective filling devices. For example, the lift means comprises a lifting table, which can be positioned in the correct height by the operator by means of a two-hand operation. The use of a two-hand operation represents an additional safety precaution, because it ensures that the operator is located outside of the danger zone of the lift means.

According to an embodiment, the fats are removed from the pallet out of a box and the block of fat is emptied into the second input device, where the block of fat is melted on the feeder grate and the liquid fat is then transferred into the storage container. The feeder grate can be inclined downwards, away from the operator, so that the blocks of fat automatically glide on the heated feeder grate all the way to the rear wall of the fat melter of the second input device. In the alternative, oils are placed from their packaging units into the second input device and thus directly into the storage container.

The first input device represents the addition compartment for the remaining granular and/or powdery raw materials. They are refined sugar, cacao powder, milk powder, etc., for example. The operator transfers the sacks from the lift means in the direction of the first input device for granular and/or powdery raw materials. The operator then opens the sacks and empties them into the first input device. For example, the first input device can comprise a hopper comprising a widened opening for easier filling. A lock cap, which is open during the powder feeding process, can be located below the hopper. The granular and/or powdery raw materials are filled directly into the first preparation or mixing container, respectively, via the raw material inlet of the mixing container.

Provision can be made, for example, that provision is made in the work area for an operator terminal. The operator can control the lift means, for example, via said operator terminal. The operator terminal also contains the recipe for the respective preparation and/or displays it to the operator. The operator terminal can furthermore provide instructions to the operator, at what point in time he is to add which raw materials. Provision can be made, for example, for acoustic aids, which can also be displayed by the operator terminal. Provision can furthermore be made for the operator to be able to check the components of the installation via the operator terminal, and receives error messages, for example, when interferences occur during the production, for example when heating elements and/or pumps fail, etc.

The small compact installation comprising lift means and manual operation is provided in particular for product batches of up to 1000 kg. However, it is also possible to design the installation to be larger, in which batches of more than 1000 kg can be processed. The supply of the individual raw materials can then take place via suitable conveying means, for example conveyor belts, screw conveyors, etc. In particular, provision can also be made in the case of installations, which are dimensioned so as to be larger, for an automated metering of the raw materials via a controller in combination with a weighing station and further suitable devices or the like.

The invention further relates to a method for producing and/or processing confectionery masses, in particular in an above-described installation, wherein at least one liquid raw material is mixed in a first mixing container with granular and/or powdery raw materials, and wherein the raw material mixture is further processed in at least one further product-processing device in at least one further process step, in particular wherein the raw material mixture is finely ground in a grinding device. According to the invention, the liquid raw material is sprayed into an upper container area of the mixing container via at least one spraying device. In particular, the liquid raw material is sprayed in or injected under pressure in such a way that the liquid raw material wets the inner wall surface at least almost completely in an upper container area of the first mixing container at least area by area. The upper container area of the mixing container is in particular understood to be an area, which is located above the maximum filling of the mixing container. Provision is made in particular for the spraying device to not dip into a raw material preparation at any point in time.

According to a preferred embodiment of the invention, a partial amount of the liquid raw material, which is required according to a predetermined recipe, is mixed with all of the granular and/or powdery raw materials, which are required according to the recipe, to form a first partial mixture. In particular, a partial amount of liquid raw material from the storage container is first injected or sprayed into the mixing container and the solid matters are then filled directly into the mixing container. A mixing or dissolver disk, respectively, which mixes the raw materials continuously and evenly with the liquid raw material, that is, with the presented, tempered fat, moves in the mixing container. Further additives, such as lecithin or the like can be added from an additional separate storage container, which can also be heated, if applicable, by means of metering pumps. This can take place automatically or by means of the operator, depending on the selected recipe. Caking or adhesions, respectively, on the addition compartments of the input devices are prevented effectively by means of the separate adding option of powdery and/or granular raw materials, fatty, liquid raw materials and additives.

According to an embodiment of the invention, the agitator, in particular the mixer or dissolver disk, respectively, is first moved in the mixing container, and liquid fat from the storage container is filled into the mixing container via the at least one spray head. For example, approximately ⅔ of the fat required for a preparation is filled in. In the case of a preparation comprising 300 liters of fat, only 200 liters of the fat are thus filled into the mixing container via the spray head in a first process step. In the alternative, the liquid fat can also be removed from a residual mass container. The residual mass container includes fat, which was used in response to a cleaning of the installation, and which can have contaminations with raw materials of an old production batch.

The powdery and/or granular raw materials are then filled into the mixing container, in which a flap valve, for example, opens under the feed hopper of the first input device. It is displayed to the operator via the operating terminal, for example, which raw material must be filled into the feed hopper of the first input device at what point in time in which quantity. For easier mixing of the raw materials, for example, the order, in which they are added, is important. It can be provided, for instance, that sugar must be added first, then milk powder and then cacao powder. After the powdery and/or granular raw materials have been filled in, the flap valve closes and lecithin or another additive can be metered to the raw material mixture in the mixing container from an independent storage container via a pump, and the mixture is mixed by the agitator in the mixing container for a certain period of time.

The partial mixture is then transferred into a second process container via a connecting line. For example, an agitator is turned on in the second process container and the partial mixture is pumped from the first mixing container into the second process container. After the mixing container has been emptied, a residual amount of the liquid raw material, which is required according to the predetermined recipe, is sprayed into an upper container area of the emptied mixing container via at least one spraying device, so that the inner wall surfaces in the upper container area of the first mixing container is wetted at least almost completely. The residual amount of the liquid raw material is then transferred into the second process container. This can occur repeatedly, if necessary, in that the entire residual amount of liquid raw material is divided into a plurality of partial residual amounts according to the recipe. Last ingredients are transferred from the mixing container into the process container with this small amount of residual fat, and an intermediate cleaning of the inner wall of the mixing container is carried out simultaneously. The first method step, in response to which the at least one liquid raw material and the granular and/or powdery raw materials for the composition are mixed with one another, is thus carried out sequentially in at least two steps. The mixing container is freed from raw material dust, which might adhere to the inner wall surfaces in the upper area, in that a portion of the liquid raw material or of the liquid fat, respectively, is retained and is injected into the mixing container only after the partial mixture has been transferred into the process container. Due to the fact that, as is well-known, the cleaning of stuck-on, dusty raw materials depends on speed and time, provision can be made for spraying the residual amount of liquid raw material onto the inner wall surfaces in the upper container area sequentially and with pressure, so that the powdery raw materials are suspended and can thus be discharged or pumped off, respectively, together with the residual amount of liquid raw material.

A mixing device, for example an agitator, in the form of a mixing shaft, which keeps the raw material mixture, which is pumped in, in motion continuously and which thus avoids the settling of refined sugar or other coarse components, is also arranged in the process container. In particular, the partial amount of liquid raw material and solid raw materials and the residual amount(s) of liquid raw material are mixed to form a homogenous product mixture in the process container. The process container also in particular serves as buffer, from which the product mixture can be supplied to further product-processing devices. From the heatable storage container, which has already been described, for additives, such as lecithin, for example, these additives can also be added directly into the process container by means of a separate pump. The point in time of the additive addition can thus be chosen freely and can also occur only at the end of the processing process. Meanwhile, a further preparation could be prepared in the mixing container, provided that it is the same product, so that a complete cleaning of the installation is not required, in order to avoid a contamination of the new product with old product residues.

According to an embodiment of the invention, a cleaning element, which has already been described above, passes through the connecting line between the first mixing container and the second process container, and cleans it, after the transfer of the partial mixture and/or of the residual amount. In particular, the cleaning element conveys the fat, which is located in the connecting line, all the way to the branching of the spray head. The dwell period of the cleaning element is thereby chosen in such a way that the spray head can empty and the mixing container is pumped completely empty by means of a transfer pump. The cleaning element then moves further through the connecting line between first mixing container and second process container and thus empties the connecting line. Provision can be made here, in turn, for a dwell time of the cleaning element upstream of the filling opening into the process container. The cleaning element is then moved back into its stand-by position again.

According to an embodiment of the invention, the product mixture can then be further processed from the second process container in a finishing device, the product mixture is in particular conveyed repeatedly in the cycle between the second process container and the finishing device. For example, the product is finished by means of venting/dehumidifying/degassing via a thin layer exhaust fan/dehumidifier. This takes place until the venting/degassing has been completed in combination with the flavor development of the product. The product mixture is introduced into a preheated, rotating drum, for example, under vacuum in the thin layer exhaust fan/dehumidifier, and forms a thin layer film on the inner side of the preheated, rotating drum, whereby water from the product mixture evaporates and other gases are also driven out of the product mixture. Volatile bitter substances are thereby also removed from the product mixture.

According to an embodiment, a cleaning element passes through and thereby cleans a connecting line between the second process container and the finishing device repeatedly during the finishing process. In addition or in the alternative, a cleaning element passes through and thereby cleans a connecting line between the second process container and the finishing device, after the finishing process has ended. While the product mixture is introduced into the finishing device, the cleaning element is preferably guided past the finishing device. If no further product is pumped to the finishing device any longer, the latter is nonetheless still operated for a short period of time and thus empties by itself.

The finished product is guided from the process container through a grinding device in the last production step, so as to produce or ensure, respectively, the desired final fineness of the product. For example, the grinding device can be a ball mill, an agitator bead mill or also roll mills, in particular three-roll mills or five-roll mills. These roll mills are also identified as three-roll mills or five-roll mills.

According to an embodiment of the invention, an agitator bead mill is used as grinding device. In particular, finished product is supplied to an agitator bead mill, whereby the filling of the agitator bead mill is determined sensorily. For this purpose, a certain amount of finished product is introduced into the agitator bead mill, until a discharge of product can be verified at the material outlet of the agitator bead mill. This is measured by means of sensors. The most important measured variable in this case is the temperature, because the product discharge temperature downstream from the mill is higher than the inlet temperature (temperature of between 40° and) 60°. The product discharge indicates that the grinding chamber of the agitator bead mill is now filed completely. In the now filled state, the agitator bead mill is operated for a predetermined period of time, without new finished product being pumped in or product located in the agitator bead mill being pumped off, respectively. This means that, after the reaching of a maximum filling of the agitator bead mill has been determined sensorily, the further product supply is interrupted at least temporarily and the finished product located in the agitator bead mill is ground therein. After the predetermined period of time, the product thus reaches its desired final fineness. After this period of time, the product is guided further into the external finished product tank. The supply of non-ground product from the process container is continued simultaneously. The product amount, which does not yet have the required quality due to changing operating conditions in the start-up phase, is reduced by means of this course of action, and the grinding can thus be carried out without noteworthy losses or amounts of waste, respectively.

In an alternative embodiment, it is possible as in common methods, to move the product, which is to be ground, in the cycle between process container and grinding device, whereby a dwell step should also precede in the circulation, so as to ensure the even quality of the entire product batch. Provision can furthermore be made in the case of the circulation that lecithin or other additives are also pumped into the process container during this time and are thus supplied to the product mixture.

The higher the throughput of product through the grinding device, the coarser the product remains. In contrast, a small throughput leads to a longer dwell time of the product in the grinding chamber of the grinding device and thus to a finer grinding of the product.

A pre-comminuting device for pre-comminuting coarse products, can furthermore be located in the inlet area of the agitator bead mill, which is even able to comminute nuts or not quite perfect cookies, respectively, or the like, and to adjust them to the optimal inlet fineness of the agitator bead mill. For example, a portion of not quite perfect material can be supplied at this point in time in terms of reworking. Reworking or post-processing, respectively, of confectionery is in particular understood as the collecting and reusing of confectionery products, which do not fulfill a given specification. For example, they do not have the desired shape, because they are broken or the like. The not quite perfect material, however, can also be used again in changed form as base material for new confectionary, whereby waste or scraps, respectively, can be reduced. In the alternative, a pre-comminuting device can be integrated in the place of and/or in addition to the thin layer exhaust fan/dehumidifier, so as to process not quite perfect material by reworking with a raw material preparation.

The agitator bead mill is filled with grinding bodies. Preferably, these are steel balls comprising magnetic characteristics. They are retained in the agitator bead mill at the product outlet by means of a separating device. However, it happens again and again that grinding bodies break and are then no longer retained by means of the separating device. This is why provision is made downstream from the product outlet for a magnetic filter, which filters the grinding body breakage out of the finely ground product.

According to an embodiment of the invention, a further cleaning element, in particular a cleaning element, as it has already been described above, passes through and cleans a connecting line between the second process container and the grinding device, at least after the second process container is emptied. Provision can be made in particular for the cleaning element to stop in the ring line connecting the process container and the grinding device after the junction to the grinding device. The compressed air or the fluid used for driving the cleaning element, respectively, is thus guided through the grinding device and pushes the finely ground product out of the grinding device. The cleaning element is then moved into a stand-by position again.

The installation according to the invention is a compact installation, by means of which mainly compositions for the confectionery production can be produced, in particular fillings for pralines, spreads and other sweets. In a special embodiment, different types of chocolate can also be produced by means of the installation according to the invention. The installation can also be used for the so-called reworking of confectionery compositions. These are not quite perfect waffles, broken pralines, etc., for example, which can be remanufactured and can be processed into new products again.

After the raw material feed has occurred, this is in particular a completely closed production process. The installation according to the invention is characterized in that machines known from the prior art, such as, for example, the preparation—or mixing container, conching vessels and agitator bead mills are set up and/or assembled in a closed environment. All of the procedurally coupled devices are in particular surrounded by a housing.

The production in the installation according to the invention occurs in a significantly more hygienic manner, because individual pipeline sections or all of the pipeline sections, which connect the product-processing devices, can be emptied completely and can be cleaned between the process steps. This is advantageous in particular, because the pipeline sections of the installation are heated on principle and because, as is well-known, a solid film of deposits settles quickly on the inner walls of the lines. This deposit comprises caramelized sugar, for example, and other ingredients of the product mixtures. These deposits can be avoided effectively by regularly cleaning the pipeline sections after every process step and/or also during a process step.

In the alternative or in addition to the described features, the method can comprise one or a plurality of features and/or characteristics of the above-described installation. In the alternative or in addition, the installation can also have individual or a plurality of features and/or characteristics of the described method.

BRIEF DESCRIPTION OF THE DRAWINGS

Exemplary embodiments of the invention and the advantages thereof will be explained in more detail below by means of the enclosed figures. The proportions of the individual elements relative to one another in the figures do not always correspond to the real proportions, because some forms are illustrated in a simplified manner and other forms are illustrated in an enlarged manner as compared to other elements for illustration purposes.

DETAILED DESCRIPTION

Figure 1:
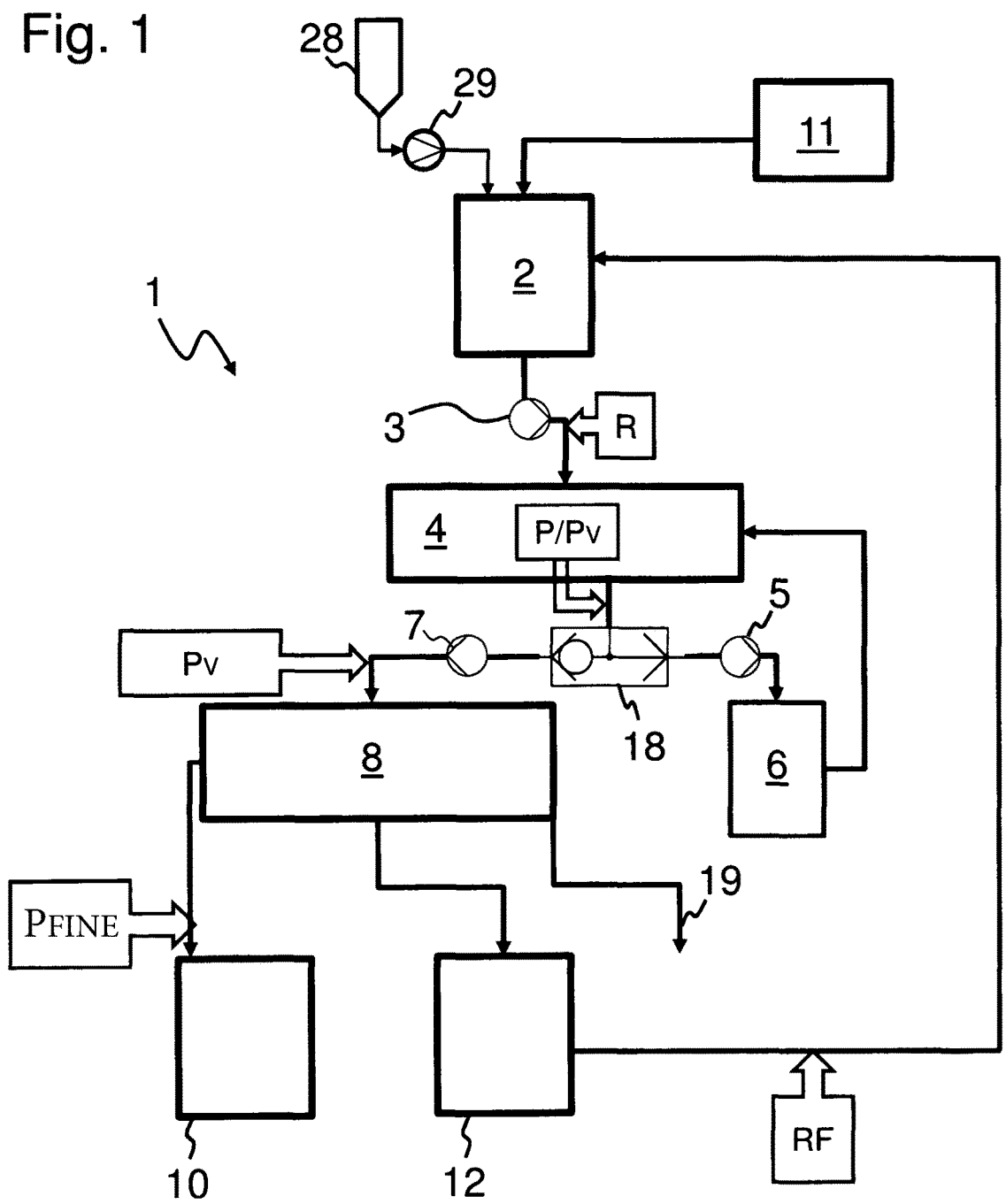
FIG. 1 shows a schematic overview of the components of an installation according to the invention.

Identical reference numerals are used for identical elements or for elements having the same effect. For overview purposes, only reference numerals, which are required for describing the respective figure, are illustrated in the individual figures. The illustrated embodiments only represent examples, for how the installation according to the invention or the method according to the invention could be designed and do not represent a conclusive limitation.

FIG. 1 shows a schematic overview of the components of an installation 1 according to the invention. The raw materials required for the product preparation of the confectionery mass are filled into a preparation or mixing container 2, respectively. The preparation or mixing container 2, respectively will only be identified with mixing container 2 hereinafter. In particular the fat is preheated hereby and is stored in a fat storage container 11, before it is filled into the mixing container 2 in liquid form. The remaining raw materials, for example refined sugar, cacao powder, milk powder and so on are added, preferably in solid form, in particular in powder form. The raw materials are mixed continuously and evenly with the presented, tempered fat in the mixing container 2. Additives, such as lecithin or the like can be added by means of a metering pump 29 from an additional separate storage container 28, which can be heated, if necessary. After all of the powdery raw materials are mixed into the fat, the raw material mixture R is transferred into a process container 4 by means of suitable pumps 3. The mixture, which is pumped in, is kept in motion continuously in the process container 4, so as to prevent the settling of refined sugar or other coarse components. The product mixture P is formed by the further mixing in the process container 4.

A finishing of the product mixture P, for example by a venting and/or dehumidifying and/or degassing takes place as next process step. In the illustrated exemplary embodiment, the finishing takes place by means of a thin layer exhaust fan or dehumidifier 6, respectively, by means of which water and/or volatile bitter substances are removed from the product mixture P, so that finished product Pv is formed. In a preferred embodiment, the product mixture P is moved across a thin layer exhaust fan/dehumidifier 6 for venting purposes. For this purpose, the product mixture P is moved from the process container 4, in particular in the circulation method, through the thin layer exhaust fan/dehumidifier 6. This takes place until the ventilation/degassing in combination with the desired flavor development has been completed. For example, the product mixture P is pumped from the process container 4 to the thin layer exhaust fan/dehumidifier 6 by means of a suitable pump 5 and is then guided back into the process container. In the alternative, the product mixture P is pumped from the process container 4 to the thin layer exhaust fan/dehumidifier 6 by means of a suitable pump 5 and is then pumped back from the thin layer exhaust fan/dehumidifier 6 to the process container 4 by means of a further pump (not illustrated).

Additives can also be added directly into the process container 4 from the already described heatable storage container 28 for additives, such as lecithin, e.g., by means of a separate pump 29*. The point in time of this additive addition can be chosen freely and can also first take place at the end of the process, e.g.

In a last production step, the finished product Pv is transferred from the process container 4 into an agitator bead mill 8. For example, the finished product Pv is pumped into the agitator bead mill 8 by means of a suitable pump 7. According to an embodiment, a changeover valve 18 is arranged between the process container 4 and the thin layer exhaust fan/dehumidifier 6 or the agitator bead mill 8, respectively, so that the product mixture P or (partially) finished product Pv, respectively, is either fed to the thin layer exhaust fan/dehumidifier 6 or to the agitator bead mill 8. For example, a sensor, which measures certain product characteristics, can be assigned to the changeover valve 18, whereupon a control unit (not illustrated) controls the changeover valve 18 and adjusts it accordingly. The desired final fineness of the finished product Pv is established in the agitator bead mill 8.

The product $P_{FINE}$ is then transferred further into an external finished product tank 10 with the desired final fineness. This can take place by means of a pump (not illustrated), for example.

Figure 2:
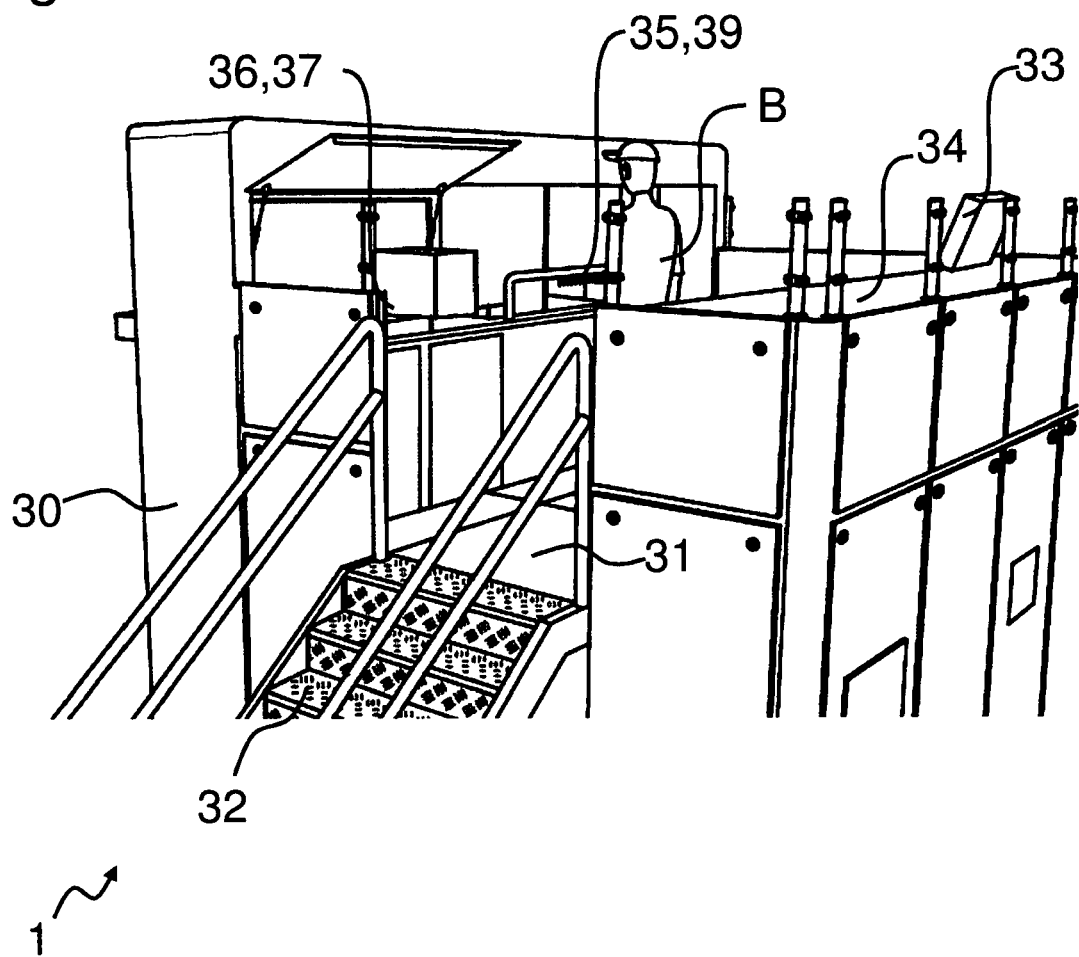
FIGS. 2 to 4 show different views of the installation.
Figure 3:
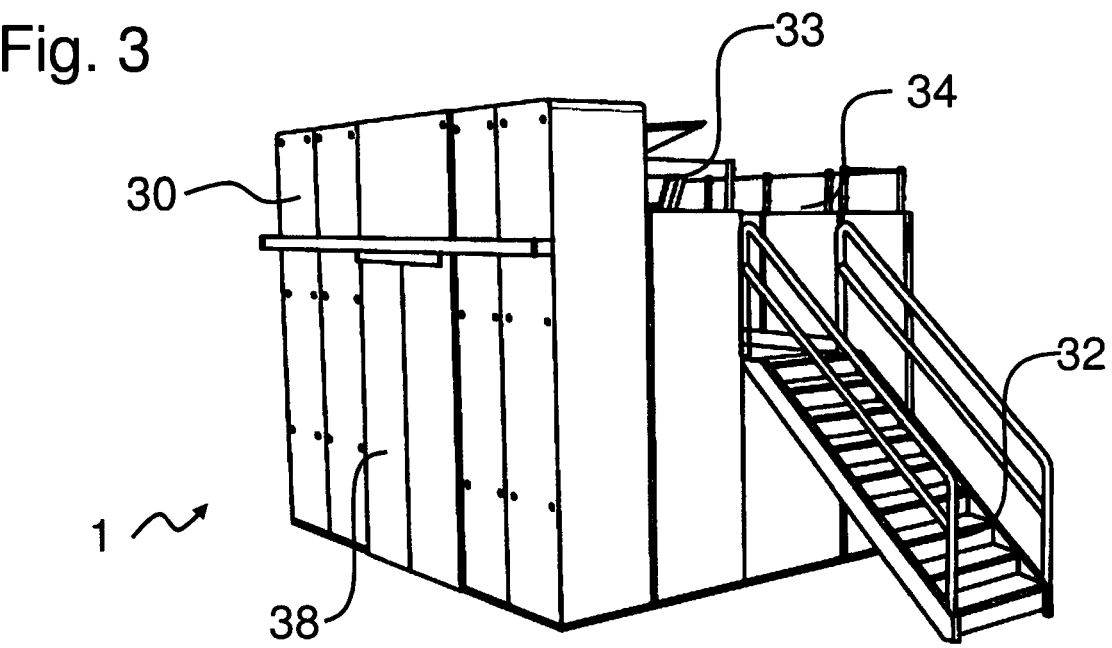
Figure 4:
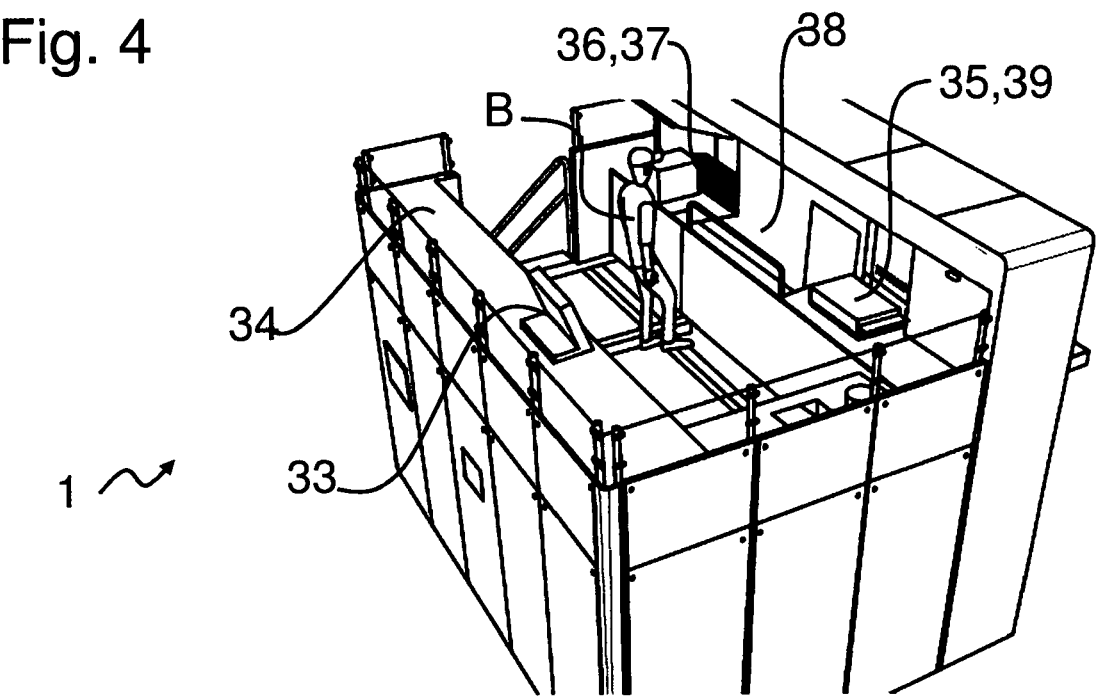

FIGS. 2 to 4 show different views of the installation 1. The installation 1 is completely surrounded by a housing 30, which, in an upper area, has a work platform 31 for one or a plurality of operators B and which can be accessed by an access 32. The work platform 31 comprises an operating terminal 33, separate infeed options 35, 36 for the raw materials required for producing the composition, such as, e.g., a first infeed position 35 for powdery raw materials or additives, and a second infeed position 36 for fats/oils. Provision can furthermore be made for a work surface 34 for light cleaning work. The raw materials are fed to the work platform 31 via a closed elevator 38. The elevator 38 is designed in such a way that it can be accessed from outside in a first loading position, and can be accessed by the operator B on the work platform 31 in a second removal position. The elevator 38 is designed in such a way that it has space for at least one euro pallet, so that all ingredients of the recipe can be placed into the elevator 38 on a euro pallet and can be moved to the height of the work platform 31.

In particular, the pallet loaded with raw materials is transported to the lifting table of the elevator 38 via forklift and is placed thereon. The elevator is closed, for example by means of a manually adjustable or automatically closable sliding door, and the lifting table is moved upwards. The operator B then removes all of the raw materials, which are required for a preparation, from the euro pallet, which is moved to working height. The "removal height", thus the position of the pallet in the elevator shaft, can in each case be adapted in an ergonomically advantageous manner, which simplifies the removal of the ingredients. In particular, the operator B can always bring the lifting table of the elevator 38 into a suitable height by means of a two-hand operation or the like, so that he does not need to lift the raw materials, that is, the operator B can simply "park" the pallet in an operating height, which suits him. When the operator B stands on the work platform 31 in front of the elevator 38, the second feed position 36 for fats/oils is located on one side. It preferably comprises a cover cap. If solid fats are used for the preparation, they are removed from the pallet in a box, and this box is emptied into the second feed position 36 after opening the cover cap. In the alternative, the oils are moved from their packaging units into the second feed position 36. The fat is melted via a heatable feed grate 37 and is introduced into a fat storage container 11 in the liquid state (see FIGS. 1, 5 to 7). Preferably, the heatable feed grate 37 is inclined at least slightly to the rear, so that the blocks of fat glide to the rear wall of the second feed position 36 by themselves. The cover cap of the second feed position 36 is then closed, so as to keep it clean and so as to prevent a contamination of the installation 1, in particular of the work platform 31, by melted fat.

The first feed position 35 for the powdery raw materials, for example refined sugar, cacao power, milk powder and so on, is located on the other side of the operator B and above the mixing container 2 (see FIGS. 1, 5 to 7). All of the powdery raw materials, which are required for the composition, are also kept on the pallet in the elevator 38. The operator B transfers the packaging with the raw materials from the elevator 38 in the direction of the first feed position 35. The packaging is then opened. This either takes place manually by the operator B, but provision can also be made for suitable devices for an automated removal, opening and/or filling of the remaining, powdery raw materials. The raw materials are emptied into the feed hopper 39. A sluice flap (not illustrated), which is open during the powder feed process, is located below the feed hopper 39. The powdery raw materials are filled directly into the mixing container 2 (see FIGS. 1, 5 to 7), via the feed hopper 39.

Figure 5:
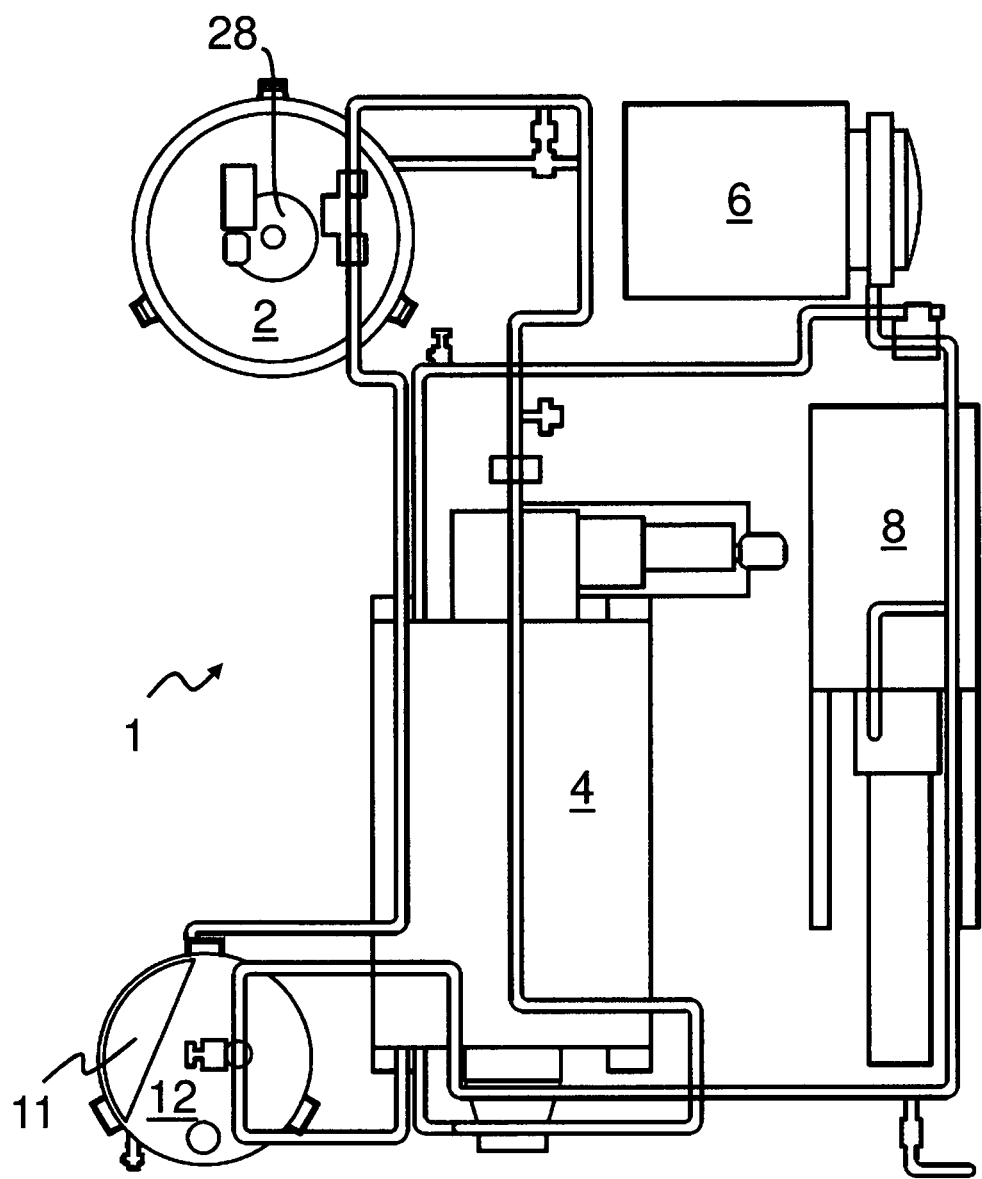
FIG. 5 shows an illustration of an arrangement of the components of an installation according to the invention from the top.
Figure 6:
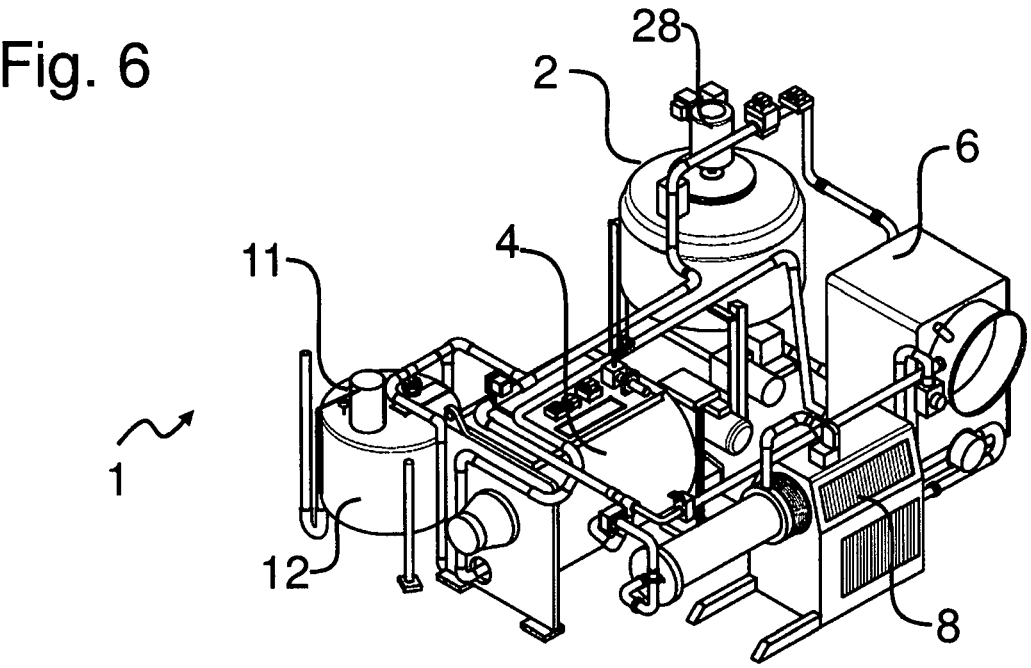
FIG. 6 shows a perspective illustration of an arrangement of the components of an installation according to the invention.
Figure 7:
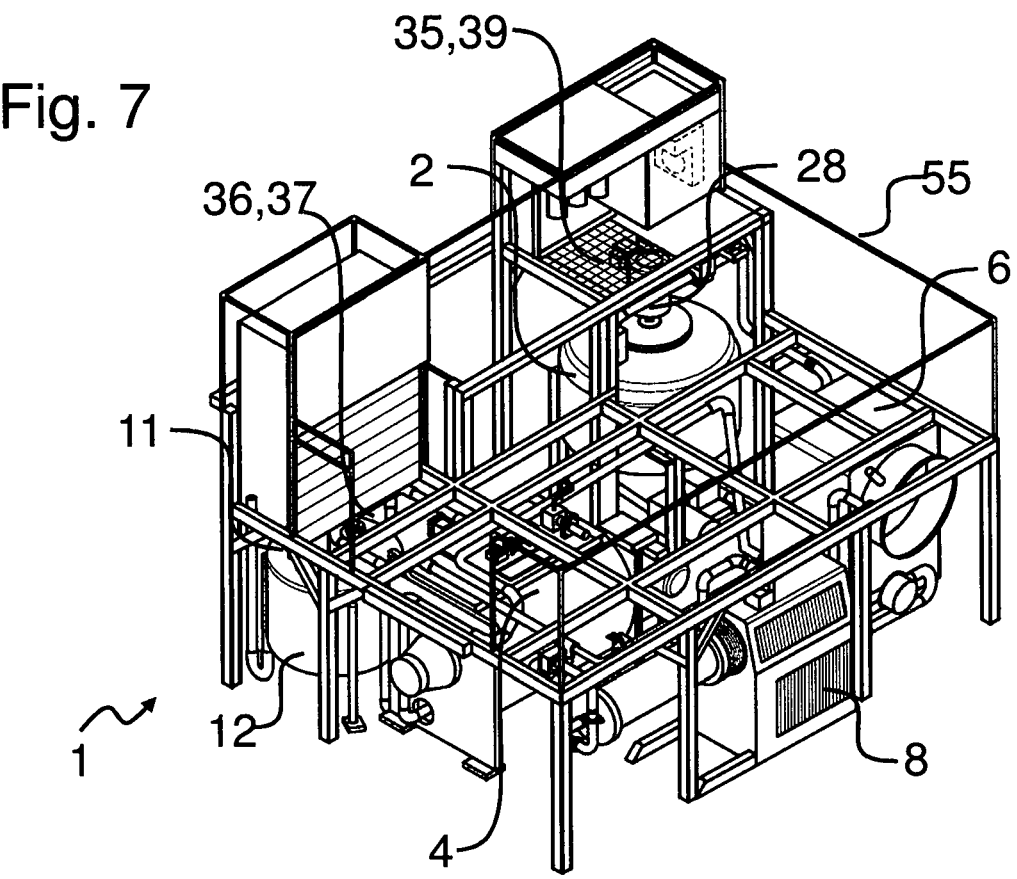
FIG. 7 shows a perspective illustration of an arrangement of the components of an installation according to the invention, including illustration of frame elements for the housing of the installation.
Figure 8:
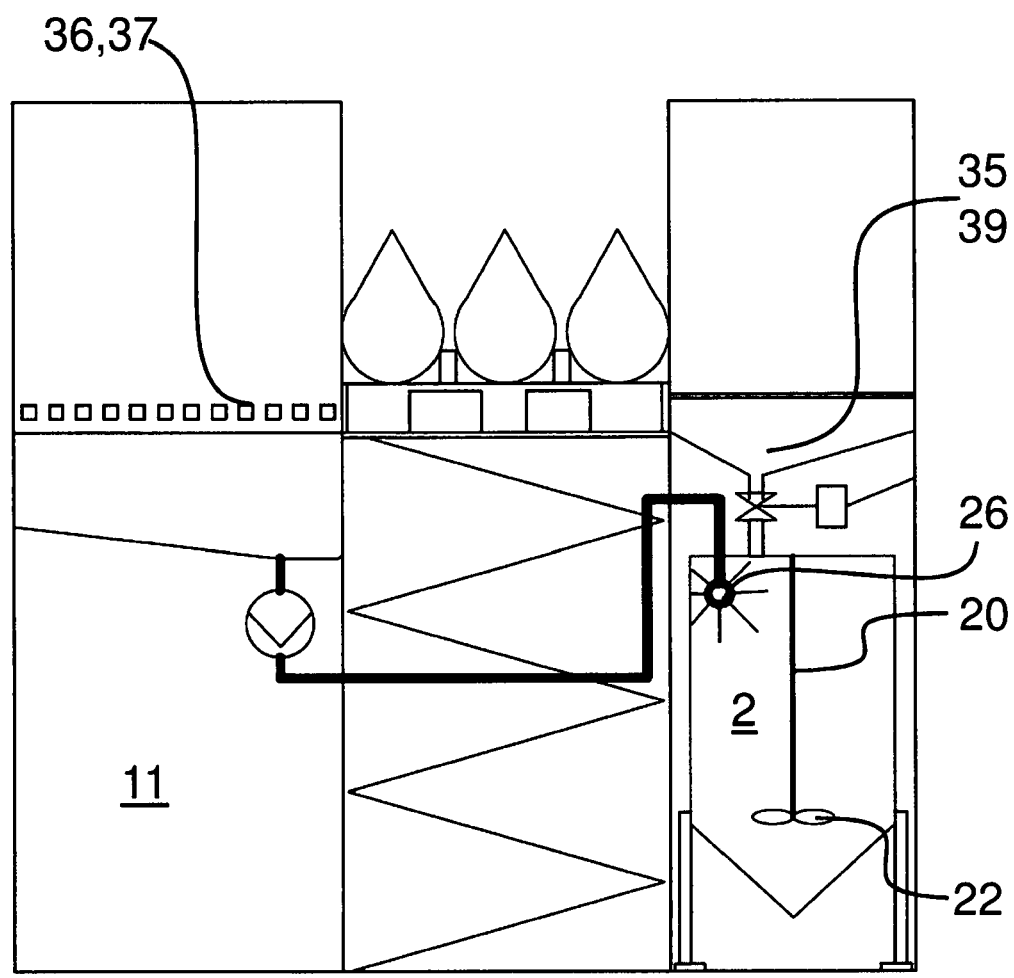
FIG. 8 shows a cross section through an installation according to the invention.

FIG. 5 shows an illustration of an arrangement of the components of an installation 1 according to the invention from the top; FIG. 6 shows a perspective illustration of an arrangement of the components of an installation 1 according to the invention, FIG. 7 shows a perspective illustration of an arrangement of the components of an installation 1 according to the invention, including the illustration of frame elements 55 for the housing (not illustrated) of the installation 1, and FIG. 8 shows a cross section through an installation 1 according to the invention. The individual components of the installation 1 are in each case provided with the same reference numerals as in FIG. 1 and are partially not described again, reference is instead made to the description relating to FIG. 1.

It follows in particular from the comparison of FIGS. 6 and 7 that the first feed position 35 for the powdery raw materials is arranged directly above the mixing container 2, so that the powdery raw materials are filled directly into the mixing container 2. In contrast, the second feed position 36 for the fat is arranged above the fat storage container 11. The fat is guided or pumped, respectively, from this fat storage container 11 into the mixing container 2.

Figure 9:
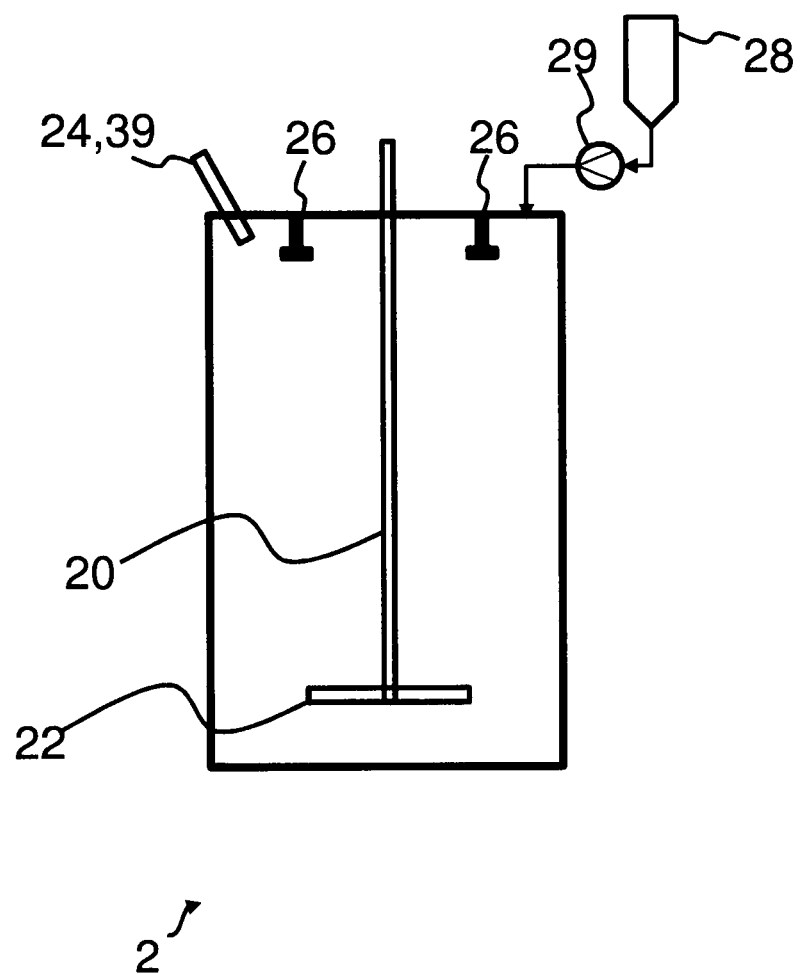
FIG. 9 shows a schematic illustration of a preparation or mixing container, respectively.

FIG. 9 shows a schematic illustration of a mixing container 2. The liquid fat is guided or pumped, respectively, from the fat storage container 11 (see FIGS. 1 and 5 to 8) via at least one spray head nozzle 26 on the cover of the preparation or mixing container 2, respectively, into the latter. At the beginning of each new preparation, a pre-cleaning of the mixing container 2 is thus attained. A portion of the fat required for the preparation is held back for a subsequent intermediate cleaning step. A mixer or dissolver disk 22, which mixes the raw materials, which are added subsequently, continuously and evenly with the supplied tempered, liquid fat, moves in the mixing container 2.

Additives, such as lecithin or other admixtures can be added from an additional separate (heatable) storage container 28 by means of metering pumps 29. This can take place automatically, depending on the selected recipe. The powdery raw materials are filled into the mixing container, which is partially filled with fat, via a raw material inlet 24. This can in particular be an extension of the feed hopper 39, which has already been described in the context of FIGS. 2 to 4. Caking and/or adhesions on the feed positions 35, 36 are prevented effectively by means of the separate feed option of powdery raw materials and liquid fatty raw materials and additives. The feeding of the additives from the additional storage container 28 can either take place in a program-controlled manner or manually by the operator B.

After all of the powdery raw materials in the mixing container 2 have been mixed into the liquid fat, the so-called raw material mixture R is transferred into the process container 4 by means of pumps 3. A retained residual amount of fat is introduced into the mixing container 2 via the cleaning nozzles 26 and is then further pumped into the process container 4, after the raw material mixture R has been transferred from the mixing container 2 into the process container 4. The last raw material components are transferred from the mixing container 2 into the process container 4 with this small residual amount of fat (see FIG. 9) and an intermediate cleaning of the mixing container 2 is carried out simultaneously. The product mixture P is obtained by mixing the raw material mixture R and the residual amount of fat in the process container 4.

Figure 10:
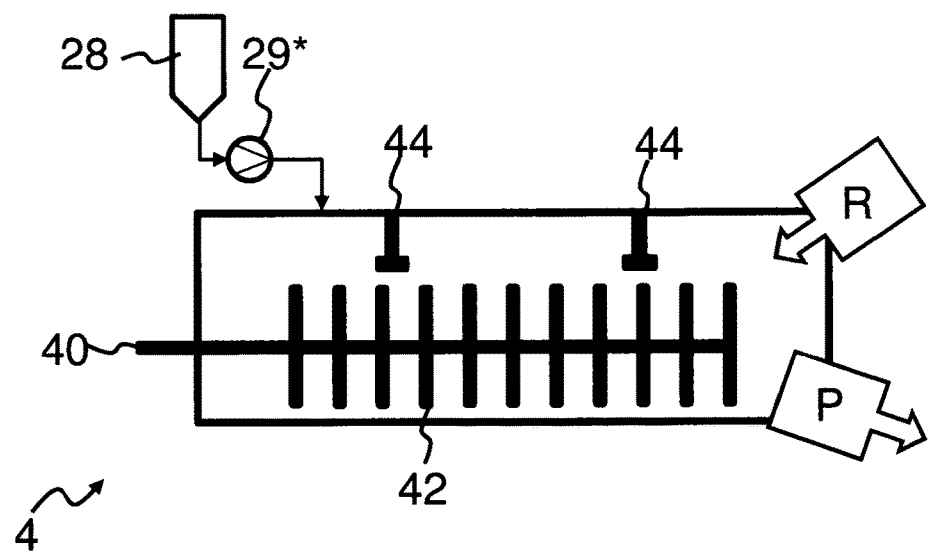
FIG. 10 shows a schematic illustration of a process container.

FIG. 10 shows a schematic illustration of a process container 4. At least one agitator shaft 40, which continuously keeps the raw material mixture R, which is pumped in, and the residual amount of fat in motion, and which mixes them to form a product mixture P, is arranged in the process container 4. The settling of refined sugar or other coarse components of the product mixture P is also prevented by means of the continuous motion.

Figure 11:
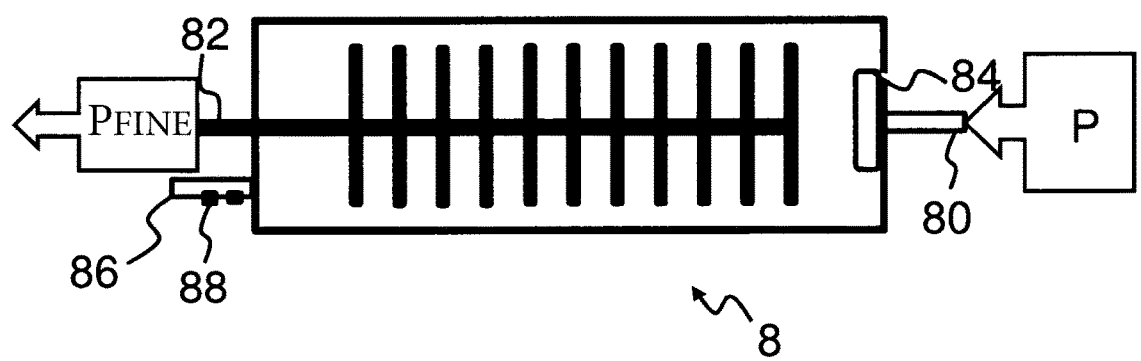
FIG. 11 shows a schematic illustration of an agitator bead mill.

The last production step lies in producing the desired final fineness in the case of the finished product Pv from the process container 4 (see also description relating to FIG. 1). The finished product Pv is transferred into an agitator bead mill 8 for this purpose, as it is illustrated in an exemplary manner in FIG. 11. A certain amount of finished product Pv is filled into the agitator bead mill 8 for this purpose, until a small amount of the finished product Pv discharges at the material outlet 86 of the agitator bead mill 8. This is measured by means of sensors 88. The most important measured variable in this case is the temperature, because the product discharge temperature downstream from the mill is higher than the inlet temperature (temperature of between 40° and 60°). In the filled state, the agitator bead mill 8 runs for a predetermined time, without further finished product Pv being pumped in or finished product Pv located in the agitator bead mil 8, respectively, being pumped off. After the predetermined time, the finished product Pv thus reaches its desired final fineness. After this time, the product $P_{FINE}$ is guided further into the external finished product tank 10 (see FIG. 1). The supply of non-ground finished product Pv from the process container 4 is continued simultaneously.

The amount of finished product Pv, which does not yet correspond to the required quality due to changing operating conditions in the start-up phase, is reduced by means of this course of action, and the grinding can thus be carried out without noteworthy losses or amounts of waste, respectively. In a further embodiment, it is possible, as in common process, to move the product $P_{Fine}$, which is to be ground, in a circle. A pre-comminuting module 84 for pre-comminuting coarse products, which is even able to comminute nuts or not quite perfect cookies, respectively, or the like, and to adjust them to the optimal inlet fineness of the agitator bead mill 8, is located in the inlet area 80 of the agitator bead mill 8.

A further important function of the installation 1 is the option to clean the installation 1 completely, without having to disassemble it. A certain amount of fat is pumped from the fat storage container 11 into the mixing container 2 for the cleaning. The pumping takes place via at least one spray head 26, which is arranged in the cover of the mixing container 2, whereby all of the caking located in the mixing container 2 on the cover and/or on the side walls are flushed downwards. After the flushing of the mixing container 2, the used fat is introduced into the process container 4 via the normal production route. The process container 4 also has at least one, preferably at least two spray heads 44, via which the complete process container 4 can be sprayed and thus be cleaned. The fat from the process container 4 can then be moved either across the thin layer exhaust fan/dehumidifier 6 and/or via the agitator bead mill 8 for cleaning purposes. This can in particular be controlled via the changeover valve 18. After the cleaning operations have been completed, the operator B can decide, whether the fat is pumped across a separate waste disposal line 19 for waste disposal, or whether it is introduced into a so-called residual mass container 12 (see FIG. 1). The fat RF located in the residual mass container 12, which is contaminated with small amounts of product, can be used for a new preparation.

To be able to clean the individual lines of the installation 1, which connect the product-processing devices, between the individual process steps, the system also has a cleaning system comprising cleaning elements. Highly-viscous liquids, paste-like media, also powders and granulates, can be removed almost completely from the lines with the help of the cleaning elements. An almost spherical cleaning element, which is fitted in the center, is thereby pressed through the line system by means of water or compressed air. The cleaning element has a cross sectional surface, which largely corresponds to the cross sectional surface of the lines, at least area by area, so that the cleaning element is arranged in the line without play or without only slight play. The cleaning element pushes the medium, which is to be removed from the line, in front of it. The used cleaning elements are plastic bodies of differently formed material, which fit exactly into the pipelines, and which are driven through them by means of compressed air. Sealing lips thereby rest against the pipe walls, and the cleaning element pushes residual product and/or fats, which might possibly be present in the lines, in front of it to the next product-processing device. The material, which is pushed into the agitator bead mill 8, for example, by means of the cleaning element, can be also be pushed out of the agitator bead mill 8 via the process air, by means of which the cleaning element can be moved.

Preferably, provision is made for connecting line cycles, provision is made, for example, for a first connecting line cycle between the mixing container 2 and the process container 4. A second ring cycle is provided between process container 4 and thin layer exhaust fan/dehumidifier 6. The function is described in an exemplary manner for the first connecting line cycle between the mixing container 2 and the process container 4. The cleaning element is pushed through the line between the mixing container 2 and the process container 4 and thereby pushes remaining product, which is transferred into the process container 4, in front of it, for example through openings in the connecting line, while the cleaning element is further moved into its stand-by position, which is preferably assigned to the mixing container 2. In particular, a first connecting line between mixing container 2 and process container 4 are cleaned by means of a first cleaning element after each production step, or a second connecting line between process container 4 and thin layer exhaust fan/dehumidifier 6 is cleaned by means of a second cleaning element, respectively. Due to the fact that the cleaning element cannot move around corners, the connecting lines are equipped with corresponding curves, at which an accumulation of product is already made more difficult due to the shape, in particular in combination with an anti-adhesive surface.

Figure 12:
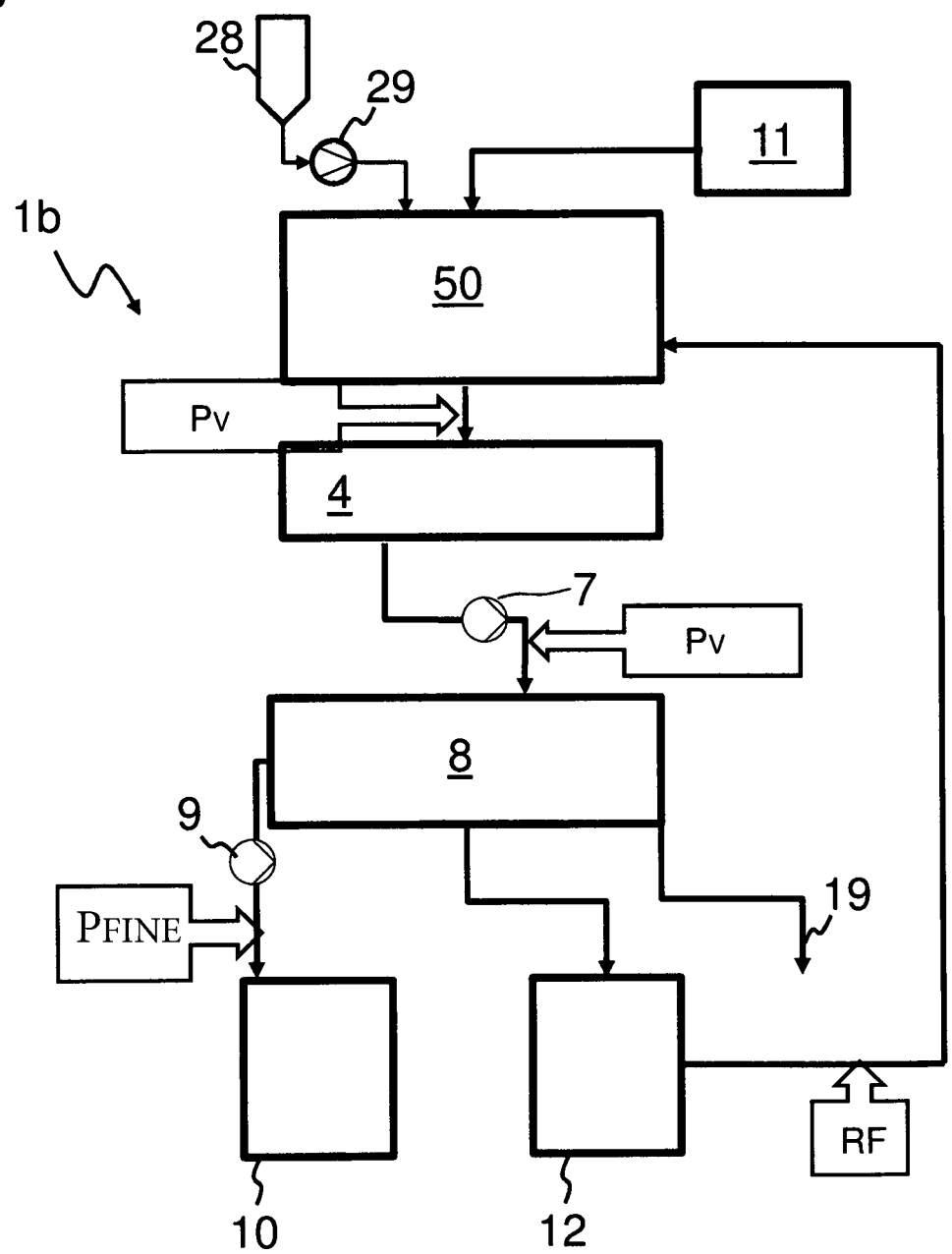
FIG. 12 shows a schematic overview of the components of a further embodiment of an installation according to the invention.

FIG. 12 shows a schematic overview of the components of a further embodiment of an installation 1b according to the invention. The latter differs from the above-described installation 1 in that a conching device 50 is used instead of the mixing container 2 and the thin layer exhaust fan/dehumidifier 6 for processing chocolate masses and high-quality compositions. A particularly intensive mixing of the mass as well as the setting of the rheology, that is, of the deformation and flow behavior of the mass and of the flavor, are possible hereby. The addition of the raw materials and/or additives into the conching device 50, in which the setting of the desired rheological characteristics and of the flavor then occurs as well, occurs thereby. The above-described principle of using spray heads for adding liquefied fat components can also be applied here.

From the conching device 50, the product Pv is then either moved through an agitator bead mill 8 in a passage or in a cycle, so as to attain the desired final fineness $P_{FINE}$. An intermediate container can be used to increase the production capacity. For example, a process container 4 is present optionally, for increasing the throughput of the installation 1b. In particular, a portion of the product Pv, which is produced by means of the conching device 50, can be stored temporarily in the process container 4, while a different portion is already ground further in the agitator bead mill 8. The finally conched mixture Pv can be pumped from the process container 4, either in a passage (as described above) or in the cycle for grinding by means of the agitator bead mill 8, so as to attain the required final fineness $P_{FINE}$.

The above-described option of the pre-cleaning and intermediate cleaning by using spray nozzles and the retention of a residual fat amount can be carried out analogously in this embodiment. In particular, the cleaning of the installation 1b by means of conching device 50 is simpler than in the case of the installation 1 described in FIGS. 1 to 11, due to the significantly smaller amount of individual machines. The use of spray nozzles (26, 44, see FIGS. 8 and 9) and the above-described cleaning technology with cleaning elements inside the connecting lines of the installation 1b is possible analogously to the first described embodiment.

The invention was described with reference to a preferred embodiment. However, a person of skill in the art can envision that modifications or changes can be made to the invention, without thereby leaving the scope of protection of the claims below.

What is claimed is:

1. An installation for producing and/or processing confectionery masses made from at least one liquid raw material and granular and/or powdery raw materials, comprising at least a first mixing container and at least a further product-processing device, wherein the first mixing container has at least one raw material inlet and a product outlet and a mixing device for mixing the raw materials at least almost completely homogenously, characterized in that, in an upper container area, at least the mixing container comprises at least one spraying device for supplying the at least one liquid raw material, wherein at least one outlet cone of the spraying device is oriented in the direction of an inner wall surface of the first mixing container at least area by area and deposits liquid raw material on the inner wall in the upper container area of the first mixing container.

2. The installation according to claim 1, wherein the at least one spraying device is pivotably and/or rotationally movable.

3. The installation according to claim 1, wherein two product-processing devices, which are procedurally coupled to one another, are coupled to one another via a connecting line and wherein a cleaning element, which is movable along the connecting line, is arranged in the connecting line, wherein, at least area by area, the cleaning element has a cross section, which corresponds approximately to a cross section of the connecting line, and wherein no play or only a small play is embodied at least area by area between the inner wall of the connecting line and the cleaning element.

4. The installation according to claim 1, wherein the installation comprises a mixing container, a finishing device, a process container and a grinding device, and wherein provision is in each case made between mixing container and process container, between process container and finishing device and/or between process container and grinding device for a connecting line comprising a cleaning element.

5. The installation according to claim 4, wherein a pre-comminuting device is assigned to the grinding device.

6. The installation according to claim 4, wherein at least one sensor for detecting product discharge from the grinding device is assigned to the grinding device on the product outlet.

7. The installation according to claim 1, wherein the installation comprises a storage container for preheated, liquid fat, a first mixing container, a second process container, a finishing device and a grinding device, which are surrounded by a housing, wherein provision is made on an operator side of the housing for a first filling device for granular and/or powdery raw materials, and provision is made for a second filling device for a raw material fat.

8. The installation according to claim 7, wherein the operator side of the housing is an upper side, which is embodied as work area for a human operator, wherein the first filling device is arranged at least almost completely above the first mixing container, is embodied as feed hopper, and has a direct access to the first mixing container.

9. The installation according to claim 7, wherein the second filling device comprises a melting device for melting fats, which are provided in solid form, and wherein at least the storage container comprises a heating device.

10. The installation according to claim 7, wherein the installation comprises a lift means for providing raw materials.

11. The installation according to claim 10, wherein the lift means is arranged between the first and the second feed device, and wherein the vertical position of the lift means can be adjusted.

12. A method for producing and/or processing confectionery masses, comprising:
using an installation for producing confectionery masses made from at least one liquid raw material and granular and/or powdery raw materials, the installation having at least a first mixing container and at least a further product-processing device, wherein the first mixing container has at least one raw material inlet and a product outlet and a mixing device for mixing the raw materials at least almost completely homogenously, characterized in that, in an upper container area, at least the mixing container comprises at least one spraying device for supplying the at least one liquid raw material, wherein at least one outlet cone of the spraying device is oriented in the direction of an inner wall surface of the first mixing container at least area by area;
wherein the at least one liquid raw material is mixed in the first mixing container with granular and/or powdery raw materials, and wherein the raw material mixture is further processed in the at least one further product-processing device in at least one further process step, characterized in that the liquid raw material is sprayed into the upper container area of the mixing container via the at least one spraying device, wherein the liquid raw material wets the inner wall surfaces at least almost completely in the upper container area of the first mixing container, at least area by area.

13. The method according to claim 12, wherein a partial amount of the liquid raw material, which is required according to a predetermined recipe, is mixed with all of the granular and/or powdery raw materials, which are required according to the recipe, to form a first partial mixture,
   wherein the partial mixture is transferred into a second process container via a connecting line,
   wherein a residual amount of the liquid raw material, which is required according to the predetermined recipe, is sprayed into an upper container area of the emptied mixing container via at least one spraying device, so that the inner wall surface in the upper container area of the first mixing container is wetted at least almost completely and
   wherein the residual amount of the liquid raw material is transferred into the second process container.

14. The method according to claim 13, wherein the partial mixture and the residual amount of the liquid raw material are mixed in the second process container to form a product mixture.

15. The method according to claim 13, wherein a cleaning element passes through and cleans a connecting line between the first mixing container and the second process container, after transferring the partial mixture and/or the residual amount of liquid raw material.

16. The method according to claim 14, wherein the product mixture is further processed in a finishing device, in particular wherein the product mixture is conveyed repeatedly in the cycle between the second process container and the finishing device.

17. The method according to claim 16, wherein a cleaning element passes through and thereby cleans a connecting line between the second process container and the finishing device repeatedly during the finishing process and/or wherein a cleaning element passes through and thereby cleans a connecting line between the second process container and the finishing device, after the finishing process has ended.

18. The method according to claim 16, wherein finished product is supplied to a grinding device, wherein the filling of the grinding device is determined sensorily, wherein the product supply is interrupted at least temporarily after reaching the maximum filling and the finished product is finely ground in the grinding device within a predetermined time period, wherein finely ground product is removed from the grinding device.

19. The method according to claim 18, wherein a cleaning element passes through and thereby cleans a connecting line between the second process container and the grinding device at least after emptying the second process container.

* * * * *